United States Patent
Zbib

(10) Patent No.: US 6,748,064 B2
(45) Date of Patent: Jun. 8, 2004

(54) SYSTEMS AND METHODS FOR LEAST COST ROUTING OF LONG DISTANCE OR INTERNATIONAL TELEPHONE CALLS

(75) Inventor: Oussama Zbib, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 210 days.

(21) Appl. No.: 09/749,994

(22) Filed: Dec. 28, 2000

(65) Prior Publication Data

US 2002/0101974 A1 Aug. 1, 2002

(51) Int. Cl.[7] .............................................. H04M 15/00
(52) U.S. Cl. ............................. 379/114.02; 379/221.02; 379/201.01; 379/88.17
(58) Field of Search ........................ 379/221.02, 114.02

(56) References Cited

U.S. PATENT DOCUMENTS

| 5,430,719 A | 7/1995 | Weisser, Jr. ................ 370/389 |
| 5,748,717 A | 5/1998 | Chan et al. ................... 379/120 |
| 5,781,620 A * | 7/1998 | Montgomery et al. . 379/114.02 |
| 6,108,408 A | 8/2000 | Plunkett et al. .............. 379/221 |
| 6,144,641 A * | 11/2000 | Kaplan et al. ............... 370/238 |
| 6,574,216 B1 * | 6/2003 | Farris et al. ................. 370/352 |

FOREIGN PATENT DOCUMENTS

| WO | WO 99 23808 | 5/1999 |
| WO | WO 00 22845 | 4/2000 |

* cited by examiner

*Primary Examiner*—Jack Chiang
*Assistant Examiner*—Karen Le
(74) *Attorney, Agent, or Firm*—Woodcock Washburn LLP

(57) ABSTRACT

A routing table enables a particular long distance carrier for a particular long distance or international destination at a particular time. Different entries in the routing table correspond to different days and times for different long distance and international destinations. If a subscriber dials a number corresponding to the information in the routing table, the carrier corresponding to that information is used to carry the call, instead of the subscriber's default carrier. If the subscriber dials a number that does not correspond to an entry in the routing table, then the default carrier is used to carry the call.

19 Claims, 3 Drawing Sheets

| Index | Day of week | Time of Day | Destination Type | Destination Prefix | Destination Label | Carrier / Plan |
|---|---|---|---|---|---|---|
| 1 | Any | Evening | International | 1613 | Canada/Night | Sprint 0.05/min |
| 2 | Any | Daytime | International | 1613 | Canada/Day | PT-1 Comm 0.06/min |
| 3 | Workday | Daytime | Interstate | 1XXX | Interstate Day | PT-1 Comm 0.06/min |
| 4 | Workday | Evening | Interstate | 1XXX | Interstate Eve'g | Sprint 0.05/min |
| 5 | Weekend | Any | Interstate | 1XXX | Interstate Wkend | PT-1 Comm 0.05/min |
| 6 | Any | Any | International | 01133 | France | PT-1 Comm 0.106/min |
| 7 | Any | Any | International | 01122 | UK | ATN TTI ULTRA 0.076/min |

SYSTEMS AND METHODS FOR LEAST COST ROUTING OF LONG DISTANCE OR INTERNATIONAL TELEPHONE CALLS

FIELD OF THE INVENTION

The present invention relates in general to telephone systems. More particularly, the present invention relates to telephone systems that offer least cost routing of long distance or international telephone calls to their subscribers.

BACKGROUND OF THE INVENTION

A residential long distance subscriber (also referred to herein as a "calling party" or "user") typically has a long distance carrier to handle all the long distance calls (and international calls) made by the subscriber. The long distance calls made by the subscriber are automatically routed to the long distance carrier when the subscriber uses the conventional "1+" dialing scheme. In addition, the subscriber may, at any time, dial around the network and select a specific long distance carrier for that call. The dial around process typically includes dialing "101"+"XXXX" followed by the long distance number, where "XXXX" is reserved for a specific carrier or long distance plan.

Various long distance carriers have different rate plans depending on the calling number, the called number, the time of day, and/or the day of the week, for example. It is desirable for a user to use the most cost effective carrier/rate plan for each individual call. However, it is difficult for a user to remember the most cost effective carrier/rate plan at a given time/date for a certain destination. Certain internet web sites provide this information, but it is cumbersome for a user to access these web sites prior to each long distance or international call.

Therefore, a need exists for a system and method that allows a user to determine and access the most cost effective carrier/rate plan for individual calls at a particular time and/or day.

SUMMARY OF THE INVENTION

The present invention is directed to systems and methods for routing a call from a calling party to a called party in which an incoming call request is received from the calling party, and a carrier is then determined based on the incoming call request and a set of routing instructions. The call is processed or otherwise routed using the determined carrier.

According to aspects of the invention, receiving the incoming call request comprises receiving a telephone number to be called, and determining the carrier comprises comparing a prefix of the telephone number to the set of routing instructions.

According to further aspects of the invention, the set of routing instructions comprises a routing table comprising a plurality of carriers and associated destination prefixes. Moreover, the set of routing instructions may comprise associated times of day and/or associated days of week.

According to other aspects of the invention, it is determined if the calling party is a subscriber (authorized user or calling party) prior to the determination of the carrier. If the calling party is a subscriber then the carrier is based on the incoming call request and the set of routing instructions; otherwise, the carrier is set to a default carrier.

According to additional aspects of the invention, determining the carrier comprises comparing a prefix of the telephone number to be called contained in the incoming call request to the set of routing instructions, and if there is a carrier corresponding to the prefix, then determining the carrier to be the corresponding carrier, and otherwise determining the carrier to be a default carrier.

The foregoing and other aspects of the present invention will become apparent from the following detailed description of the invention when considered in conjunction with the accompanying drawings.

BRIEF DESCRIPTION OF THE DRAWINGS

FIG. 2 shows an exemplary routing table in accordance with the present invention.

DESCRIPTION OF EXEMPLARY EMBODIMENTS AND BEST MODE

The present invention is directed to a long distance and international call destination routing table and systems and methods in which the routing table may be embodied and used.

Referring now to the figures, a preferred embodiment of the system and method of the present invention will be described. For purposes of this description, it is assumed that the reader is familiar with basic telephony concepts and terminology.

Figure 1:
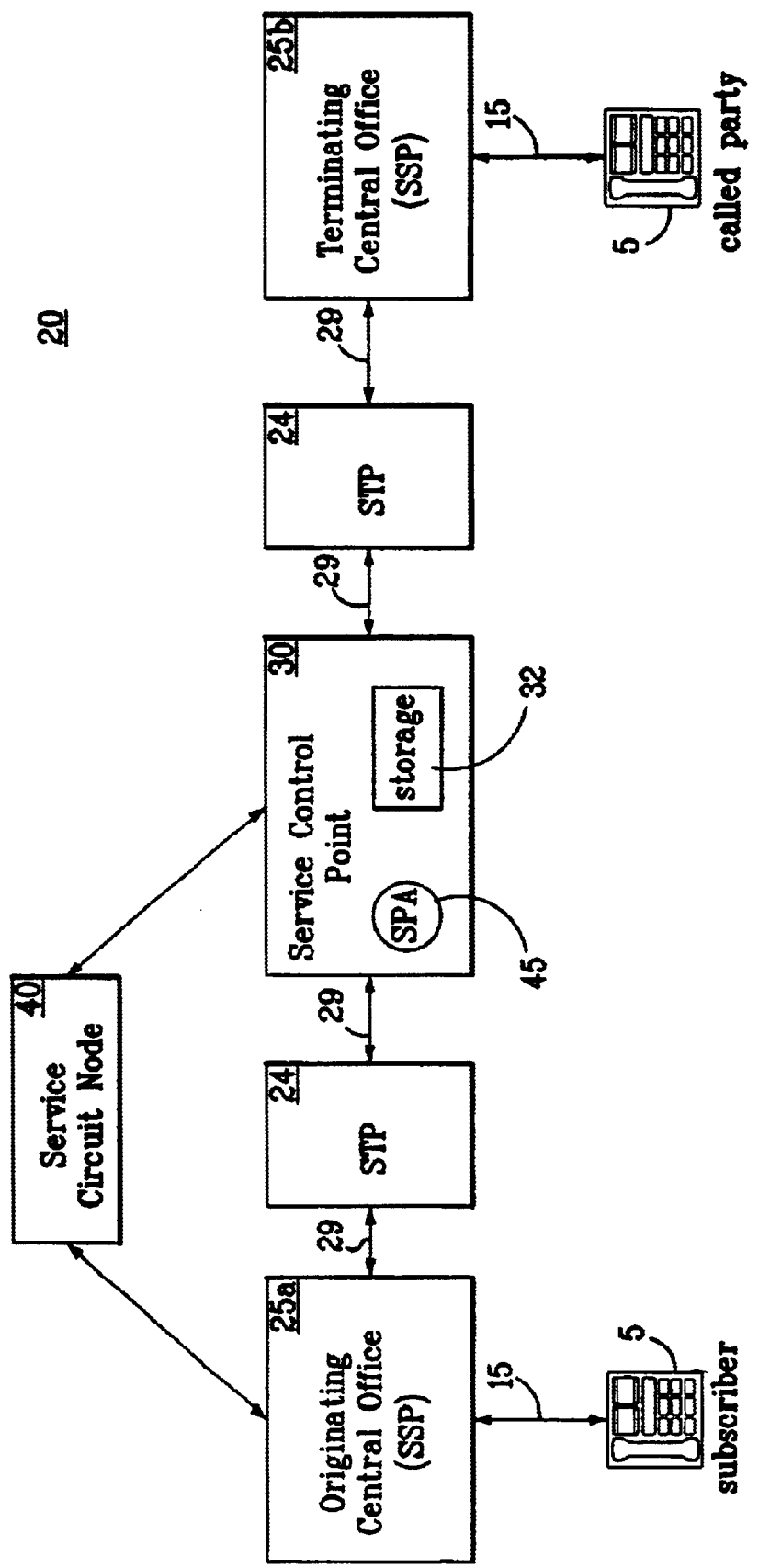
FIG. 1 shows a simplified schematic diagram of an exemplary system in accordance with an embodiment of the present invention.

Referring to FIG. 1, a subscriber location 5 including a subscriber telephone set is connected via a telephone line 15 (e.g., POTS, or similar) to a telephone system 20 including at least one central office switch 25a, at least one service control point 30 ("SCP"), and a service circuit node 40. This exemplary environment is a public switched telecommunication network ("PSTN"). A portion of the PSTN is illustrated in FIG. 1 and described generally below.

In particular, the detailed portion of the PSTN illustrates a part of the Advanced Intelligent Network ("AIN") of a typical local exchange carrier. For brevity, only a basic explanation of the PSTN is provided herein. Where the PSTN operates or is composed differently in an important aspect from that which would be understood by those skilled in the art, additional details are provided herein. For further information regarding the referenced PSTN and AIN aspects thereof, the interested reader is referred to the patent to Weisser, U.S. Pat. No. 5,430,719, which is incorporated herein by reference.

The AIN includes a variety of interconnected network elements. A group of such network elements includes the plurality of central offices 25a, 25b which are service switching points ("SSPs"). A central office or SSP is a switch and the terms are used interchangeably herein. The SSPs 25a, 25b have a plurality of subscriber lines 15 connected thereto, although only one is shown for simplicity. A subscriber line may also be referred to as a calling line. Each SSP serves a designated group of calling lines, and thus, the SSP or switch that serves a particular calling line may be referred to as its serving switch. Each calling line is connected typically to a piece of terminating equipment including a plurality of telephones. Although telephones are illustrated as the pieces of terminating equipment in FIG. 1, those skilled in the art will understand that such pieces include other telecommunication devices such as facsimile machines, computers, modems, etc.

Pursuant to the preferred embodiment, each active calling line in an AIN is assigned a ten digit calling line number. In the description of the present invention, the term "calling line number" is used in its generally understood meaning to be the number which is dialed or input by a caller or source to reach a piece of terminating equipment on a calling line associated with the dialed calling line number. A calling line number is commonly referred to as a telephone number or a directory number and is contained within an incoming call request from the caller. The present invention can also be used with calling line numbers have fewer or more than ten digits (e.g., international telephone numbers).

SSPs are interconnected by a plurality of trunk circuits. These are the voice path trunks that interconnect the SSPs to connect communications. The term "communication" or "call" is used herein to include all messages that may be exchanged between subscriber or calling party and called party in the network illustrated in FIG. 1. Each of the SSPs 25a, 25b is connected to another type of AIN element referred to as a local signal transfer point ("STP") 24 via respective data links 29. Currently, these are data links employing a signaling protocol referred to as Signaling System 7 (SS7), which is well known to those skilled in the art. Much of the intelligence of the AIN resides in yet another type of AIN element referred to as a local SCP 30 that is connected to STP 24 over a SS7 data link. Among the functions performed by the SCP 30 is the maintenance of network databases and subscriber databases. These databases may be used in providing temporary telecommunication services to a customer. Typically, the SCP 30 is also the repository of service package applications ("SPAs") 45 that are used in connection with or as part of the databases in the application of telecommunication services or enhanced features to calling lines.

In order to keep the processing of data and calls as simple as possible, a relatively small set of triggers is defined as the SSPs for each call. A trigger in the AIN is an event associated with a particular calling line that generates a packet to be sent to an SCP 30. The trigger causes the SCP 30 to query its database 32 for processing instructions with respect to the particular call. The results of the database inquiry are sent back to the SSP in a response from the SCP 30 through STP 24. The return packet includes instructions to the switch as to how to process the call. The instructions may be to take some special action as a result of a customized calling service or enhanced feature. In response, the switch moves through its call states, collects the called digits, and generates further packets that are used to set up and route the calls. Similar devices for routing calls among various local exchange carriers are provided by regional STPs and regional SCPs.

As illustrated in FIG. 1, the AIN also includes a service circuit node 40 ("SN"), which may also be referred to herein as a service node. SN 40 includes voice and dual tone multi-frequency ("DTMF") signal recognition devices and voice synthesis devices. In addition, SN 40 may include a data assembly interface. SN 40 is connected to the local SCP 30 via data link using an X.25 protocol. In addition, SN 40 typically is connected to one or more (but usually only a few) SSPs via Integrated Service Digital Network ("ISDN") links as shown by the connection to SSP or central office switch 25a.

The central office switch 25a may be connected to a plurality of subscriber sets or locations 5. The telephone set can be any conventional telephone set. Additionally, the SCP 30 may provide routing instructions to a plurality of central offices. Connections 29 between the central office 25a and the SCP 30 are preferably TCP/IP high speed network connections (e.g., fiber optic, ethernet, etc.).

A routing table is stored in a database 32 of the SCP 30 or other storage. An exemplary routing table or grouping 50 is shown in FIG. 2. The routing table 50 comprises a set of routing instructions and enables a particular carrier for a particular long distance or international destination. Different entries can be made for various days and times and for different long distance and international destinations. For example, in FIG. 2, entries 51 and 52 have been inserted in the routing table for telephone numbers having the destination prefix "1613". Thus, when a subscriber dials a number beginning with "1613", instead of the default carrier being used to carry the call, the carrier in the entry in the routing table 50 corresponding to the destination is used to carry the call. Thus, for example, if a subscriber dials a number beginning with "1613", and the call is placed in the evening (e.g., after 9 pm), then the carrier in cell 51 (e.g., Sprint) is used to carry the call, under the $0.05/minute plan. If the call is in the daytime (e.g., before 9 pm), then carrier in cell 52 (e.g., PT-1 Comm) is used to carry the call, under the $0.06/minute plan. If the caller dials a number that does not correspond to an entry in the routing table 50, then a default carrier is used to carry the call.

In a preferred embodiment, a subscriber generates or otherwise constructs a long distance/international call routing table 50 for each of a plurality of destinations. For example, the user can be supplied with data regarding long distance/international carriers plans from the internet (e.g., from a publicly available website), or from another source such as a telephone service provider or carrier, and can then create a routing table using web-based tools. A subscriber selects different long distance carriers based on criteria such as destination (e.g., area code, country code), time of day, and cost. Alternately, the subscriber could use a telephone keypad to input the routing table entries.

Optionally, a routing table can be generated quasi-automatically for the subscriber. In this manner, a user would enter destinations (e.g., "France" or "area code 613"), and the system would then set up the routing table using data received by (or stored in) the system. The user enters destinations, and the system fills in the "best" provider (i.e., the lowest cost provider) for all times of the day (e.g., provided in one hour increments).

After the routing table 50 is created, it is stored, for example, by being sent to the AIN SCP 30 (e.g., by the subscriber), and stored therein. The AIN based service is able to act on the routing table in real time on a call by call basis. When a subscriber goes off hook and dials a long distance number, a trigger is activated and the SSP 25a sends a query message to the SCP 30 for the preferred carrier based on destination and time of day stored in the database. The SCP 30 returns the carrier information to the SSP 25a based on the customer-entered profile/routing plan, preferably including the best Carrier Identification Code (CIC) to be used. Desirably, this will be transparent to the subscriber who would get billed by that carrier on a call by call basis. The SSP 25a then routes the call using the carrier determined from the routing table 50.

More particularly, preferably, the system is an AIN system that includes AIN functionality. It is contemplated that an AIN Off-Hook Immediate ("OHI") trigger is put onto a subscriber's line. When the subscriber goes off-hook, the trigger fires the central office 25a, the central office 25a messages the SCP 30, and directs that the SCP 30 send a query (using TCP/IP, for example) to its database 32 (or other storage) to analyze the routing table stored therein and determine which carrier and plan to use. When the SCP 30 receives the return message, the call is routed, and optionally, processing is transferred to the service node 40. The service node 40 generates an announcement stating the carrier that is being used to carry the call (e.g., "You are using MCI"). Optionally, the rate is also announced ("5 cents per minute"). Preferably, no announcement is issued if the default long distance provider is being used. Thus, a subscriber will not hear anything unless a carrier other than the default is being used. Desirably, a default carrier is provided if none of the criteria in the database is met.

Figure 3:
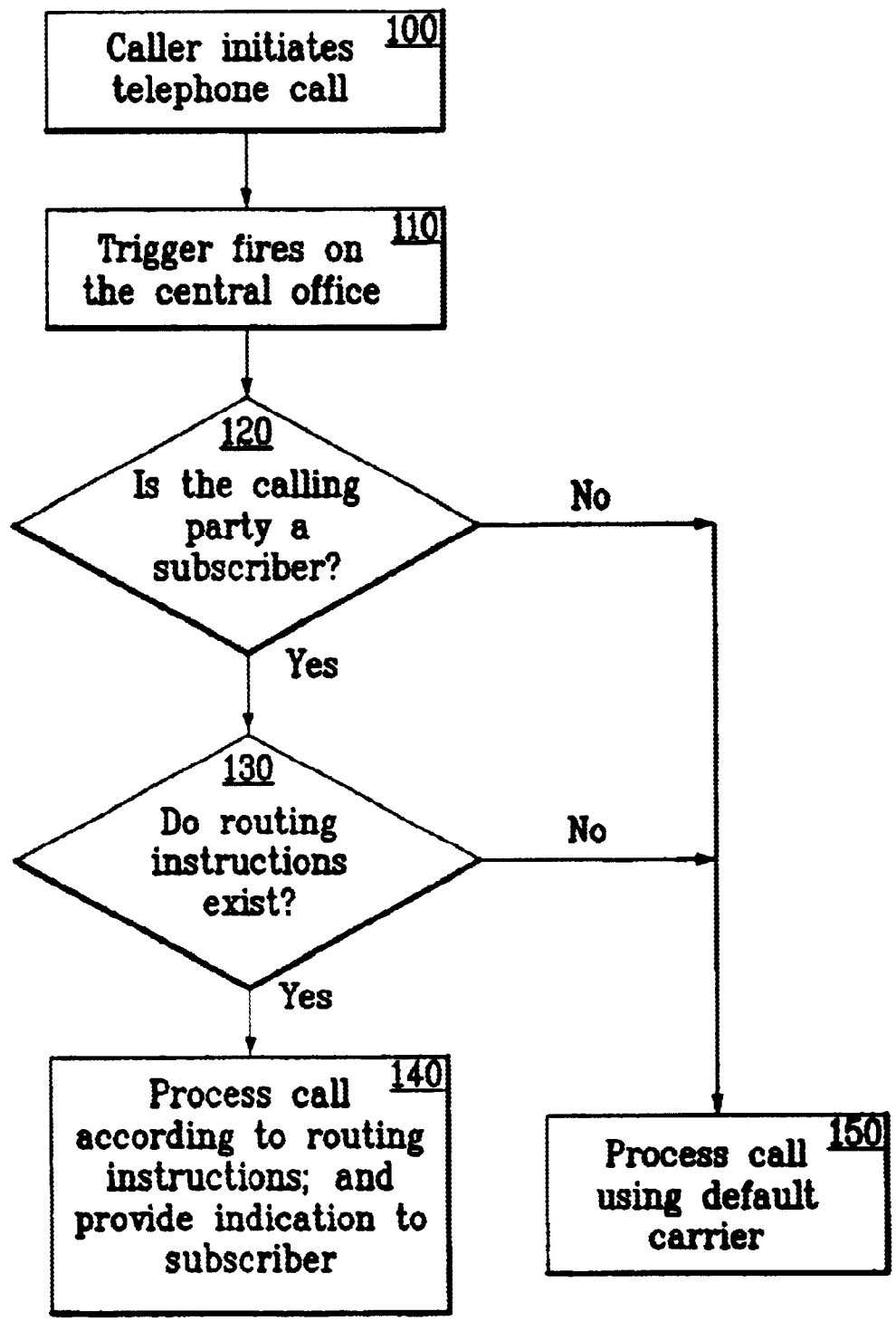
FIG. 3 shows a flow chart of an exemplary method of operation of the system of FIG. 1 in accordance with the present invention.

FIG. 3 shows a flow chart of an exemplary method of operation of the system of FIG. 1 in accordance with the present invention. At step 100, a calling party takes his telephone off-hook and dials the called number. At step 110, in the embodiment in which the invention is implemented on an AIN system, an AIN trigger (e.g., Off-hook Immediate (OHI) trigger) fires on the central office switch SSP 25*a* and the SSP 25*a* receives the called number. It is then determined, at step 120, whether the calling party is subscriber. Preferably, this is determined by querying a database or other storage in the system. For example, the SSP 25*a* then sends a query to the SCP 30 requesting whether the calling party is a subscriber. The SCP 30 receives the query from the SSP 25*a* and a SPA 45 determines whether the calling party is a subscriber. The SPA 45 may determine that the calling party is a subscriber by analyzing information contained in the query message or by analyzing information contained in a database. Preferably, this is determined by comparing the calling party's telephone number to a list or group of telephone numbers (a subscription list) of users that subscribe to call routing embodied in the present invention. If the calling party's telephone number is in the subscription list, then the party is a subscriber. Preferably the subscription list resides in the database 32.

If the calling party is not a subscriber, then the call is processed conventionally at step 150. If the calling party is a subscriber, then it is determined at step 130 if the called number has a set of routing instructions predetermined for it in the routing table. For example, the SPA 45 queries the database 32 in which the routing table resides for routing instructions. If there are no instructions in the routing table for the called number, the call is then processed using a default carrier at step 150. If there are instructions in the routing table for the called number, the call is processed according to the instructions; i.e., the carrier designated in the routing table is used for that call, at step 140. An optional announcement is made to the subscriber indicating or otherwise identifying the carrier being used and/or the price of the call.

As an added feature, the system analyzes the subscriber's usage and calling patterns (for example, each month), and recommends alternatives to lower the subscriber's phone bill further. It is contemplated that a pattern analyzer/monitor resides on the SCP 30.

The invention may be embodied in the form of appropriate computer software, or in the form of appropriate hardware or a combination of appropriate hardware and software without departing from the spirit and scope of the present invention. Further details regarding such hardware and/or software should be apparent to the relevant general public. Accordingly, further descriptions of such hardware and/or software herein are not believed to be necessary.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A method for routing a call from a calling party to a called party, comprising:
   receiving an incoming call request from the calling party;
   determining a carrier based on the incoming call request and a subscriber-generated routing table comprising a set of routing instructions comprising a plurality of carriers and associated destination prefixes; and
   routing the call to the called party using the carrier.

2. The method according to claim 1, wherein receiving the incoming call request comprises receiving a telephone number to be called, and determining the carrier comprises comparing a prefix of the telephone number to the set of routing instructions.

3. The method according to claim 1, further comprising determining if the calling party is a subscriber prior to determining the carrier, and if so, then determining the carrier based on the incoming call request and the set of routing instructions, and otherwise determining the carrier to be a default carrier.

4. The method according to claim 1, wherein determining the carrier comprises comparing a prefix of the telephone number to be called contained in the incoming call request to the set of routing instructions, and if there is a corresponding carrier corresponding to the prefix, then determining the carrier to be the corresponding carrier, and otherwise determining the carrier to be a default carrier.

5. The method according to claim 1, wherein receiving the incoming call request from the calling party comprises receiving the incoming call request at a central office.

6. The method according to claim 1, further comprising identifying the carrier to the calling party after determining the carrier.

7. The method according to claim 1, further comprising receiving the subscriber-generated routing table from the calling party prior to receiving the incoming call request from the calling party.

8. The method according to claim 7, wherein receiving the subscriber-generated routing table comprises receiving a plurality of carriers with associated destination prefixes via web-based tools.

9. The method according to claim 7, wherein receiving the subscriber-generated routing table comprises receiving at least one of associated times of day and associated days of week via web-based tools.

10. A system for routing a call from a calling party to a called party using a carrier within a telecommunications network, comprising:
    a central office for receiving an incoming call request comprising a destination prefix from the calling party;
    a storage device for storing a subscriber-generated routing table comprising a set of routing instructions comprising a plurality of carriers and associated destination prefixes; and
    a controller for determining the carrier based on the destination prefix and the subscriber-generated routing table, and for routing the call to the called party using the carrier.

11. The system according to claim 10, further comprising web-based tools for allowing subscriber-generation of the routing table.

12. The system according to claim 10, wherein the set of routing instructions further comprises at least one of associated times of day and associated days of week.

13. The system according to claim 10, further comprising a device for identifying to the calling party the determined carrier.

14. The system according to claim 13, wherein the device is a service node.

15. The system according to claim 10, wherein the controller determines if the calling party is a subscriber prior to determining the carrier based on the destination prefix and the set of routing instructions.

16. The system according to claim 15, wherein the controller determines the carrier based on the destination prefix and the set of routing instructions if the calling party is a subscriber, and otherwise determines the carrier to be a default carrier.

17. The system according to claim 10, wherein the controller compares the destination prefix of the incoming call request to the set of routing instructions, and if there is a corresponding carrier corresponding to the prefix, determining the carrier to be the corresponding carrier, and otherwise determining the carrier to be a default carrier.

18. A routing table for use in determining a carrier to be used in routing a call from a calling party to a called party comprising a plurality of carriers and associated destination prefixes, days of week, and times of day, wherein the routing table is subscriber-generated and accessed responsive to an incoming call request generated by the calling party to determine the carrier to be used in routing the call.

19. The routing table according to claim 18, wherein the sub scriber-generated routing table is generated via web-based tools.

* * * * *

UNITED STATES PATENT AND TRADEMARK OFFICE
CERTIFICATE OF CORRECTION

PATENT NO. : 6,748,064 B2
DATED : June 8, 2004
INVENTOR(S) : Oussama Zbib

It is certified that error appears in the above-identified patent and that said Letters Patent is hereby corrected as shown below:

<u>Column 8,</u>
Line 13, "sub scriber-generated" should read -- subscriber-generated --

Signed and Sealed this

Twenty-seventh Day of July, 2004

JON W. DUDAS
*Acting Director of the United States Patent and Trademark Office*